United States Patent
Terazawa

(10) Patent No.: US 6,843,410 B2
(45) Date of Patent: Jan. 18, 2005

(54) ENCODER-EQUIPPED SEAL

(75) Inventor: Hiroshi Terazawa, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 0 days.

(21) Appl. No.: 10/739,135

(22) Filed: Dec. 19, 2003

(65) Prior Publication Data

US 2004/0129768 A1 Jul. 8, 2004

(30) Foreign Application Priority Data

Dec. 20, 2002 (JP) ........................................ 2002-369223

(51) Int. Cl.$^7$ ............................................. G06C 15/42
(52) U.S. Cl. ....................... 235/103; 235/487; 235/493; 235/494; 384/448
(58) Field of Search ................................. 235/103, 487, 235/493, 494; 384/448; 324/173, 174, 207.22

(56) References Cited

U.S. PATENT DOCUMENTS

| | | | | |
|---|---|---|---|---|
| 4,778,286 A | * | 10/1988 | Kadokawa | ................... 384/446 |
| 4,864,231 A | * | 9/1989 | Okumura et al. | ........... 324/173 |
| 5,998,987 A | * | 12/1999 | Ikeuchi et al. | ............... 324/173 |
| 6,186,667 B1 | * | 2/2001 | Nakamura et al. | .......... 384/448 |
| 6,323,640 B1 | * | 11/2001 | Forestiero et al. | .......... 324/174 |
| 6,573,705 B1 | * | 6/2003 | Tajima et al. | ................ 324/174 |
| 2001/0030533 A1 | * | 10/2001 | Iwamoto et al. | ............. 324/174 |
| 2002/0092902 A1 | * | 7/2002 | Sun | .............................. 235/103 |
| 2002/0097040 A1 | * | 7/2002 | Takizawa et al. | ............ 324/174 |
| 2002/0140418 A1 | * | 10/2002 | Ichiman | ....................... 324/174 |
| 2002/0141673 A1 | * | 10/2002 | Ito et al. | ...................... 384/448 |
| 2002/0175673 A1 | * | 11/2002 | Butzmann | ................... 324/174 |
| 2002/0186008 A1 | * | 12/2002 | Turner | .................... 324/207.22 |
| 2003/0173956 A1 | * | 9/2003 | Fujikawa et al. | ....... 324/207.22 |
| 2004/0036631 A1 | * | 2/2004 | Kayao | .......................... 341/15 |

* cited by examiner

Primary Examiner—Jared J. Fureman
Assistant Examiner—Allyson N Trail
(74) Attorney, Agent, or Firm—Wenderoth, Lind & Ponack, L.L.P.

(57) ABSTRACT

An encoder-equipped seal mounted on a wheel bearing unit on an automotive vehicle includes an elastic element and a reinforcing ring for sealing said wheel bearing unit and for detecting the number of revolutions of the wheel. The encoder-equipped seal further includes a first ring element and a second ring element, wherein the first ring element includes a first reinforcing ring, a first flanged portion and a magnetic attached to the first flanged portion of the first reinforcing ring, and wherein the second ring element includes a second reinforcing ring having a second flanged portion, and a seal lip arranged radially on the circumferential edge of the second flanged portion of the second reinforcing ring. The first ring element and the second ring element are united into one unit by allowing one to engage the other in such a manner that the first ring element is located axially outwardly of the wheel bearing unit and the second ring element is located axially inwardly of the wheel bearing unit.

5 Claims, 5 Drawing Sheets

ENCODER-EQUIPPED SEAL

BACKGROUND

1. Field of the Invention

Generally, the present invention relates to the construction of a seal that is mounted on a bearing unit for an automotive vehicle wheel that includes two elements, such as inner race and outer race, which rotate relative to each other. More particularly, the present invention related to such seal construction that includes an encoder that is intended for use in detecting the number of revolutions for each of the four automotive vehicle wheels, such as front and rear, right and left wheels that are under control of the antilock brake system (ABS) or traction control system (TCS).

2. Prior Art

There is a conventional apparatus for detecting the number of revolutions for the automotive vehicle wheel that is often used in conjunction with the antilock/skid control system to prevent any lock or skid from occurring on the automotive vehicle wheels. This apparatus includes an encoder that responds to the vehicle wheel or its bearing unit that is rotating and produces pulses magnetically that represent the number of revolution for the vehicle wheel or its bearing unit, and a sensor that is disposed to face opposite the encoder for responding to the pulses from the encoder.

Usually, the conventional apparatus for detecting the number of wheel revolutions is disposed in conjunction with the sealing device that is capable of sealing the bearing unit for the wheel, and is developed as an encoder-equipped seal that provides both the sealing function and rotation detecting function that is implemented as the encoder. The apparatus is used for the practical purposes. An example of the apparatus is disclosed in Japanese patent application as published under No. H6 (1994)-2810118.

One typical example of such conventional encoder equipped seal is now described by referring to FIG. 8. As shown in FIG. 8, the conventional encoder-equipped seal includes a reinforcing ring 102 having a cylindrical portion 102a extending in the axial direction of the bearing and a flanged portion 102b extending radially from the cylindrical portion 102a, a magnetic ring 103 attached to the flanged portion 102b, and a seal lip 104 disposed in the radial circumferential edge of the flanged portion 102b.

The reinforcing ring 102 is made of any of the metals such as iron, stainless steel and the like.

The seal lip 104 is an elastic element made of any of the elastic materials such as synthetic rubber, synthetic resin and the like, and molded into the appropriate shape by using any of the processes, such as the vulcanized bond molding process, so that it is supported by the flanged portion 102b of the reinforcing ring 102.

The magnetic ring 103 is an annular multi-pole magnet having S polarity and N polarity magnetized alternately in the circumferential direction, and acts as the encoder that produces pulses magnetically.

The magnetic ring 103 can be made as follows.

Firstly, an annular ring is molded by pressure-molding, a mixture composed of any of ferromagnetic materials, such as any of quench-hardened molding materials, deposit-hardened molding materials or sintered materials, in powdery or granule forms, for example, hard ferrite in powdery or granule forms, and any elastic element such as synthetic rubber or synthetic resin. The annular ring thus obtained is united with the reinforcing ring 102 by bonding it to the outer lateral side of the flanged portion 102b (right side in FIG. 8, and that is outer lateral side of the bearing unit). The annular ring thus united with the reinforcing ring 102 is magnetized so that it has S polarity and N polarity magnetized alternately in the circumferential direction. Thereby, a magnetic ring 103, which is an annular multi-pole magnet having S polarity and N polarity magnetized alternately in the circumferential direction, united with the reinforcing ring 102, and acts as the encoder, is obtained.

Alternatively, the magnetic ring 103 can be made as follows.

The reinforcing ring 102, which has the preliminary foundation treatment and adhesive coating on the axial outer lateral side of its flanged portion 102b, is placed into a mold together with the mixture composed of any of the above-mentioned ferromagnetic materials and any of the above-mentioned elastic elements, where they are pressed under the applied heating so that they can be bonded together by the vulcanized bonding process. The result thus obtained includes an annular ring united with the reinforcing ring 102 by vulcanized bonding to the outer lateral side of the flanged portion 102b (right side in FIG. 8, and that is outer side of the bearing unit). The annular ring thus united with the reinforcing ring 102 is magnetized so that it has S polarity and N polarity magnetized alternately in the circumferential direction. Thereby, a magnetic ring 103, which is an annular multi-pole magnet having S polarity and N polarity magnetized alternately in the circumferential direction, united with the reinforcing ring 102, and acts as the encoder, is obtained.

As shown in FIG. 8, this encoder-equipped seal is used in conjunction with the wheel bearing unit including two elements, such as outer race 105a and inner race 105b, rotating relative to each other. In the embodiment shown in FIG. 8, it is assumed that the outer race 105a corresponds to the rotational element and the inner race 105b corresponds to the non-rotational element.

The interior of the wheel bearing unit can be isolated from the outside by allowing the seal lip 104 to make sliding contact with the circumferential surface of the inner race 105b. In this way, the bearing unit can be protected against the entry of water or foreign matter from the outside.

In this encoder-quipped seal, a sensor 106 that has the form shown in FIG. 1(c) may be disposed in close proximity of the magnetic ring 103 so that the sensor can face opposite the magnetic ring 103. Then, the magnetic ring 103 produces pulses magnetically that represent the number of wheel revolutions and the sensor 106 responds to the pulses. Thus, the number of wheel revolutions can be detected through the sensor 106.

In the conventional encoder-equipped seal such as the one described above, it may be understood from the above description that the magnetic ring 103 is made of the mixture composed of any of the ferromagnetic materials and any of the elastic materials, and the seal lip 104 is only made of any of the elastic elements. Thus, the magnetic ring 103 and seal lip 104 are based on the respective materials having the different properties, and are provided on the reinforcing ring 102 by using any respective appropriate bonding method. This means that the magnetic ring 103 and seal lip 104 must be formed by following the two different steps as described below.

The first step is to provide a seal lip 104 formed from any synthetic rubber or synthetic resin on the flanged portion 102b of the reinforcing ring 102 by using any vulcanized bonding method so that the seal lip 104 is supported by the flanged portion 102b. The second steps is to attach a magnetic ring 103 formed from the mixture of any ferromagnetic material such as hard ferrite and any elastic material to the flanged portion 102b of the reinforcing ring 102.

The second step of attaching the magnetic ring 103, which is formed from the mixture of any ferromagnetic material such as hard ferrite and any elastic material, to the flanged portion 102b of the reinforcing ring 102 can be performed in any one of the following two ways, for example, as the before described.

In the first way, this second step includes the step of molding the mixture of the ferromagnetic material and elastic material under the applied pressure into the annular shape and then bonding the resulting annular shape to the flanged portion 102b of the reinforcing ring 102, as described above.

In the second way, this second step includes the steps of providing a reinforcing ring 102 including a flanged portion 102b having the preliminary foundation treatment and adhesive coating thereon, and then placing the reinforcing ring 102 together with the mixture of the ferromagnetic material and elastic material into a mold, where they are molded under the applied heating by the vulcanized bonding method.

Although the first way is advantageous in making the molding easier but is disadvantageous in that the additional steps such as adhesive coating or heated bonding are involved. Another disadvantage is the low mounting precision (eccentricity).

The second way is not desirable because it involves the use of different materials that require the different vulcanization periods of time or temperatures, which makes it difficult to use a general compression molding process. It is important to measure the quantities of materials to be used accurately. Thus, the second way is not desirable because it only permits the molding process to occur within the very narrow allowance.

For the recent years, the injection molding process is used in order to avoid the problems mentioned above. The injection molding process permits the molding to occur although the different materials have the different vulcanization periods of time, allowing the quantities of materials to be determined by controlling them by the injection pressures. However it requires the expensive molds or molding machines as well as the high-level molding technology. For this reason, the injection molding process is not popular.

SUMMARY OF THE INVENTION

In light of the problems associated with the conventional encoder-equipped seal described above, the principal object of the present invention is to provide an encoder-equipped seal that provides the drastically improved sensing or rotation detecting capability and sealing capability, wherein it includes the component parts or elements designed for easy molding and assembling, and is designed for detecting the number of revolutions for each of the wheels supported by the bearing unit and for sealing the bearing unit.

The present invention proposes to solve the above problems by providing the encoder-equipped seal that is mounted on the automotive vehicle wheel bearing unit, and includes the elastic element and reinforcing ring that are provided for sealing the bearing unit and for detecting the number of wheel revolutions, wherein it includes a first ring element and a second ring element that are united into one unit, with the first ring element being located outwardly in the axial direction of the wheel bearing unit and with the second ring element being located inwardly in the axial direction of the wheel bearing unit.

Specifically, the first ring element includes a first reinforcing ring having a first cylindrical portion extending axially of the wheel bearing unit and a first flanged portion extending from the first cylindrical portion in the radial direction, and a magnetic ring attached to the first flanged portion of the first reinforcing ring.

The second ring element includes a second reinforcing ring having a second flanged portion extending in the radial direction, and a seal lip disposed on the radial circumferential edge of the second flanged portion of the second reinforcing ring.

The magnetic ring is formed from a mixture composed of any of the ferromagnetic materials such as hard ferrite and any of the elastic elements, such as synthetic rubber, synthetic resin and the like, and takes the form of an annular multipole magnet having S polarity and N polarity magnetized alternately in the circumferential direction thereof. This magnetic ring provides the function of the encoder that produces pulses magnetically.

This magnetic ring can be attached to the first flanged portion of the first reinforcing ring, which is made of any of the metals such as iron stainless steel and the like, by using any one of the following methods, for example, which are usually used in the conventional encoder-equipped seal as the before described.

That is to say, a magnetic ring is provided by placing the mixture of any of the ferromagnetic materials such as hard ferrite and any of the elastic elements such as synthetic rubber, synthetic resin and the like into a mold, where the mixture is molded under the applied pressure into the annular ring. The annular ring thus obtained is attached to the first flanged portion by the appropriate bonding method, and magnetized such that it has S polarity and N polarity magnetized alternately in the circumferential direction thereof, thereby, magnetic ring can be attached to the first flanged portion of the first reinforcing ring. Alternatively, the first reinforcing ring is provided such that the first flanged portion has the preliminary foundation treatment and adhesive coating, and then it is placed into the mold together with the mixture of any ferromagnetic material and any elastic element, where they are pressed under the applied heating by using any of the known vulcanized bonding methods, such that the annular ring is attached to the first flanged portion of the first reinforcing ring. And then said annular ring is magnetized, such that it has S polarity and N polarity magnetized alternately in the circumferential direction thereof, thereby, magnetic ring can be attached to the first flanged portion of the first reinforcing ring.

The seal lip on the second ring element includes an elastic element such as synthetic rubber or synthetic resin, and is attached, by using any of the known vulcanized bonding methods, to the radial circumferential edge of the second flanged portion of the second reinforcing ring that is usually made of any of the metals such as iron, stainless steel and the like.

It may be appreciated from the above description that the encoder-equipped seal according to the present invention includes two elements having the different material properties, that is, the magnetic ring formed from the mixture of ferromagnetic material and elastic element, and the seal lip only formed from the elastic element, wherein the magnetic ring is attached to one reinforcing ring, such as the first reinforcing ring, and the seal lip is attached to the other reinforcing ring, such as the second reinforcing ring.

It may also be appreciated from the above description that the encoder-equipped seal according to the present inventions includes the first ring element and second ring element united into one unit.

Thus, the encoder-equipped seal of the present invention can be manufactured with ease and at less cost.

More specifically, the encoder-equipped seal according to the present invention can be manufactured in the easy and simple manner and at less cost, without having to use any expensive manufacturing equipment or high-level molding technology. The encoder-equipped seals thus obtained can have an improved and high mounting precision (eccentricity).

As one variation of the encoder-equipped seal described above, it may have the construction that includes one first ring element and a plurality of second ring elements, wherein the second ring elements are arranged inwardly in the axial direction of the wheel bearing unit so that they can engage the first ring element.

As another variation of the encoder-equipped seal described above, it may have the construction wherein the second reinforcing ring is formed to have the second cylindrical portion extending from the second flanged portion in the axial direction of the wheel bearing unit and wherein the first ring element and second ring element are united into one unit by engaging the second cylindrical portion of the second reinforcing ring with the first cylindrical portion of the first reinforcing ring.

As a further variation of the encoder-equipped seal described above, it may have the construction wherein the second flanged portion of the second reinforcing ring has a portion for engaging the first reinforcing ring, and wherein the first ring element and second ring element are united into one unit by allowing this portion to engage the first reinforcing ring of the first ring element.

As still another variation of the encoder-equipped seal described above, it may have the construction wherein the second flanged portion of the second reinforcing ring has a seal portion formed on the side thereof on which the first ring element is located, and wherein the side of the first ring element on which the second reinforcing ring is located is made to engage the seal portion formed on the second flanged portion.

In accordance with the encoder-equipped seal and variations thereof, the magnetic ring that produces pulses magnetically is formed from the mixture composed of any ferromagnetic material and elastic element, and the seal lip that provides the good sealing capability is formed only from any elastic element. The magnetic ring and seal lip, which are based on the different materials having the different properties as described above, can be provided on the first reinforcing ring and second reinforcing ring separately.

The encoder-equipped seal that has been completed as described above, including the first ring element and second ring element united into one unit by engaging the first and second reinforcing rings with each other, is then mounted on the wheel bearing unit. Thus, the encoder-equipped seal of the present invention can be manufactured at less cost, and provide high mounting precision.

When the encoder-equipped seal of the present invention is mounted on the wheel bearing unit, the first ring element is disposed outwardly in the axial direction of the wheel bearing unit, and the magnetic ring, that produces pulses magnetically, is attached to the first flanged potion extending radially from the first cylindrical portion of the first ring element, which engages with the circumferential surface of the one part of said wheel bearing unit. The second ring element is disposed axially and inwardly of the first ring element. The seal lip, which is disposed on the radial circumferential edge of the second flanged portion of the second ring element extending radially, makes sliding contact with the circumferential surface of the other part of said wheel bearing unit on the side facing opposite the side of the circumferential surface of the one part of said wheel bearing unit with which the first cylindrical portion of the first ring element engages.

Thus, the interior of the wheel bearing unit on which the encoder-equipped seal of the present invention is mounted can be isolated from the outside, and can be protected against the entry of any water or foreign matter from the outside.

The magnetic ring that produces pulses magnetically and the seal lip that seals the bearing unit can be formed on the respective first and second reinforcing rings separately, and this can be performed in the simple, less costly and highly efficient manner and with high precision. With the component parts or elements described so far being assembled into the encoder-equipped seal, it can be mounted on the bearing unit. Thus, the encoder-equipped seal of the present invention can be mounted on the bearing unit with the high precision, and the long-term operation can be guaranteed so that it can detect the number of wheel revolutions accurately and without causing any functional or mechanical errors.

It may be appreciated from the foregoing description that the encoder-equipped seal according to the present invention is designed for easy molding and assembling as well as the high-precision mounting, and can provide the drastically improved sensing capability and sealing capability.

BRIEF DESCRIPTION OF THE DRAWINGS

FIGS. 1(a) through 1(c) is a diagram illustrating the encoder-equipped seal according to the first embodiment of the present invention, in which FIG. 1(a) represents a cross section of the second ring element with some non-essential parts or elements being not shown, FIG. 1(b) represents a cross section of the first ring element with some non-essential parts or elements being not shown, and FIG. 1(c) represents a cross section of the encoder-equipped seal that is mounted on the bearing unit, with some non-essential parts or elements being not shown;

DETAILED DESCRIPTION OF PREFERRED EMBODIMENTS

Figure 1A:
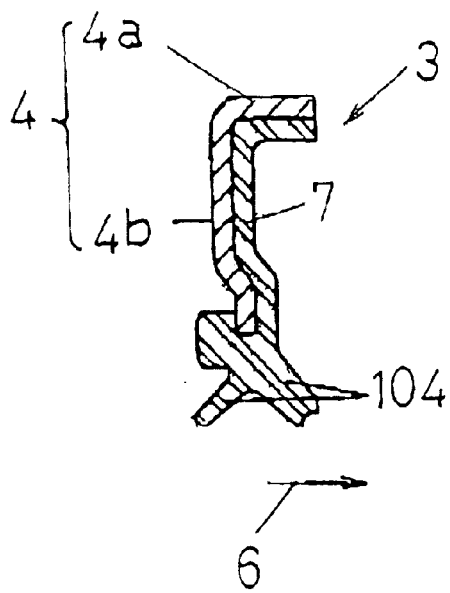

Several preferred embodiments of the present invention are now described below by referring to the accompanying drawings. It should be noted that each of the embodiments shown in FIGS. 1(a) through 7 contains some parts or elements that are similar to those in the prior art encoder-equipped seal disclosed in FIG. 8, and those similar parts or elements in FIGS. 1(a) through 7 are given common reference numerals used in FIG. 8. In the following description, therefore, those parts or elements are not described in further detail to avoid the duplication.

It should also be appreciated that the first reinforcing ring 2 and second reinforcing rings 4, 14, 24 that are included in each of the embodiments that will be described below are the reinforcing element that is made from any of the metals such as iron, stainless steel and the like, as it is known to the relevant art, as described earlier.

It should be understood that the magnetic ring 103 included in the encoder-equipped seal according to each of the embodiments described below is an annular multi-pole magnetic ring carrying S polarity and N polarity magnetized alternately in the circumferential direction, formed by a mixture composed of any of the elastic elements and any of the ferromagnetic materials such as hard ferrite and the like, and produces pulses magnetically. This magnetic ring 103 is also known to the relevant art, as described earlier.

The magnetic ring 103 can be attached to the first flanged portion 2b of the first reinforcing ring 2 by using any one of the bonding methods that are know to the relevant art, as described earlier.

The seal lip 104, seal portions 17a, etc. in the encoder-equipped seal according to each of the embodiments described below are elastic elements, which are made from any synthetic rubber, synthetic resin or any other similar materials, and provided on the peripheral edge of the second reinforcing ring 4, by using any of the methods that are known to the relevant art.

In each of the embodiments that are described below, the description of the parts or elements that have been mentioned above will be omitted because they are known as described and in order to avoid the duplication.

(Embodiment 1)

Figure 1B:
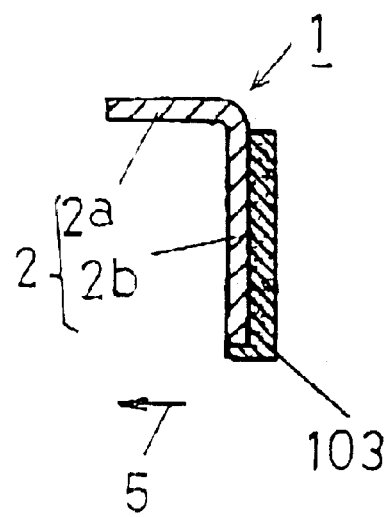
Figure 1C:
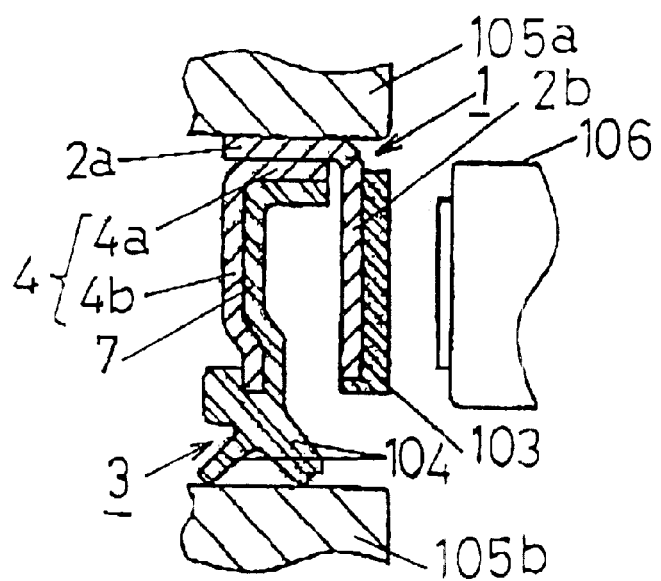

Referring first to FIGS. 1(a) through 1(c), the first preferred embodiment of the present invention is described below. The encoder-equipped seal according to this embodiment is shown in a cross section, although some non-essential parts or elements are not shown.

In accordance with this embodiment, the encoder-equipped seal includes a first ring element 1 shown in FIG. 1(b) and a second ring element 3 shown in FIG. 1(a).

The first ring element 1 includes a first reinforcing ring 2 and a magnetic ring 103, wherein the first reinforcing ring 2 has a first cylindrical portion 2a that is provided for extending in the axial direction of the wheel bearing unit on which the encoder-equipped seal is to be mounted, and a first flanged portion 2b extending from the first cylindrical portion 2a in the radial direction, and the magnetic ring 103 is secured to the first flanged portion 2b of the first reinforcing ring 2.

The second ring element 3 includes a second reinforcing ring 4 and a seal lip 104, wherein the second reinforcing ring 4 has a second flanged portion 4b that is provided for extending in the radial direction, and a second cylindrical portion 4a extending from the second flanged portion 4b in the axial direction of the wheel bearing unit on which the encoder-equipped seal is to be mounted. The seal lip 104 is disposed on the radial circumferential edge of the second flanged portion 4b of the second reinforcing ring 4.

According to this embodiment, the encoder-equipped seal can be constructed by combining the first ring 1 and the second ring 3 together in the respective directions as indicated by arrow 5 (FIG. 1(b)) and arrow 6 (FIG. 1(a)), such that the second cylindrical portion 4a of the second reinforcing ring 4 is made to engage the first cylindrical portion 2a of the first reinforcing ring 2 with the first ring element 1 being located outwardly in the axial direction of the wheel bearing unit and with the second ring element 3 being located inwardly in the axial direction of the wheel bearing unit.

FIG. 1(c) is a diagram that illustrates how the encoder-equipped seal that includes the first ring element 1 shown in FIG. 1(b) and the second ring element 3 shown in FIG. 1(a) united into one unit in accordance with this embodiment are mounted on the wheel bearing unit on the automotive vehicle.

In FIG. 1(c), the right side corresponds to the axial outside, the left side corresponds to the axial inside, and the lower side corresponds to the radial inside. In the embodiment shown in FIG. 1(c), it is assumed that in the wheel bearing unit, the outer race 105a corresponds to the rotational element and the inner race 105b corresponds to the non-rotational element.

It should be understood that the outer race 105a may correspond to the non-rotational element, and the inner race 105b may correspond to the rotational element, although this is not shown. In this case, the encoder-equipped seal may be mounted on the wheel bearing unit in such a manner that the first cylindrical portion 2a of the first ring element 1 is made to engage the outer circumference of the inner race 105b, and the seal lip 104 disposed around the radial circumferential edge of the second flanged portion 4b of the second ring element 3 makes sliding contact with the inner circumferential surface of the outer race 105a.

With the encoder-equipped seal according to this embodiment being mounted on the wheel bearing unit as shown in FIG. 1(c), a sensor 106 may be disposed in close proximity of the encoder-equipped seal so that the sensor can be located to face opposite the magnetic ring 103. As the rotational element of the bearing unit is rotating, the magnetic ring 103 may provide pulses magnetically in accordance with the number of revolutions of the wheel, and the sensor 106 may detect the number of revolutions by responding to the pulses from the magnetic ring 103.

As the encoder-equipped seal is mounted on the wheel bearing unit such that the first cylindrical portion 2a of the first ring element 1 can be made to engage the inner circumference of the outer race 105b and the seal lip 104 disposed on the radial circumferential edge of the second flanged portion 4b of the second ring element 3 can make sliding contact with the outer circumferential surface of the inner race 105b, the interior of the bearing unit can be isolated from the outside. Thus, the bearing unit can be protected against the entry of any liquid or foreign matter from the outside.

(Embodiment 2)

Figure 2:
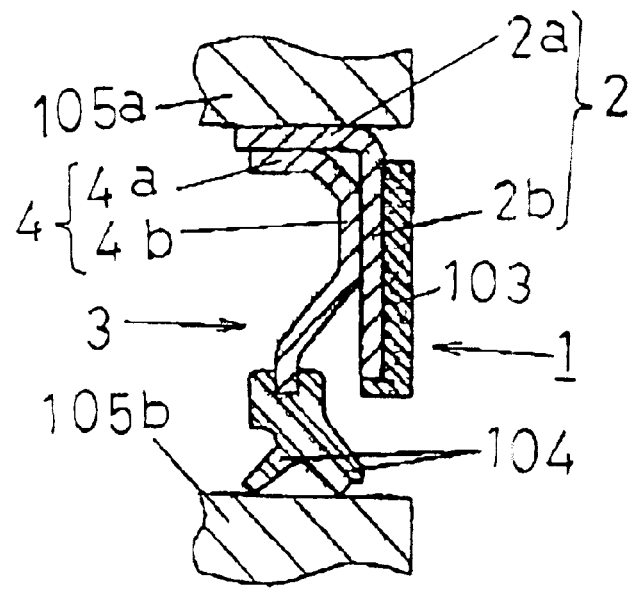
FIG. 2 represents a cross section of the encoder-equipped seal according to the second embodiment of the present that is mounted on the on the bearing unit, with some non-essential parts or elements being not shown.

Referring next to FIG. 2, the second preferred embodiment of the present invention is described below. The encoder-equipped seal according to the this embodiment is shown in a cross section, although some non-essential parts or elements are not shown. This embodiment contains some parts or elements that are similar to those in the first embodiment described by referring to FIGS. 1(a) through 1(c), and those common parts or elements are given the similar reference numerals. The description of those parts or elements is therefore omitted to avoid the duplication.

In the preceding embodiment shown in FIGS. 1(a) through 1(c), the seal lip 104, which is disposed on the radial circumferential edge of the second flanged portion 4b, extends to the side of the second flanged portion 4b on which the first ring element 1 is located, and a seal position 7 is formed on the side of the second flanged portion 4b on which the first ring element 1 is located.

On the contrary, in the embodiment shown in FIG. 2, the seal lip 104 is disposed on the radial circumferential edge of the second flanged portion 4b, but it is different in that the seal lip 104 is not extended up to the side of the second flanged portion 4b on which the first ring element 1 is located.

Another difference from the preceding embodiment is that the axial outer lateral side of the second flanged portion 4b of the second reinforcing ring 4 and the axial inner lateral side of the first flanged portion 2b of the first reinforcing ring 2 are provided so that they can engage each other.

The embodiment shown in FIG. 2 is similar to the preceding embodiment shown in FIGS. 1(a) through 1(c) in other points, and can provide the similar function and effect.

(Embodiment 3)

Figure 3:
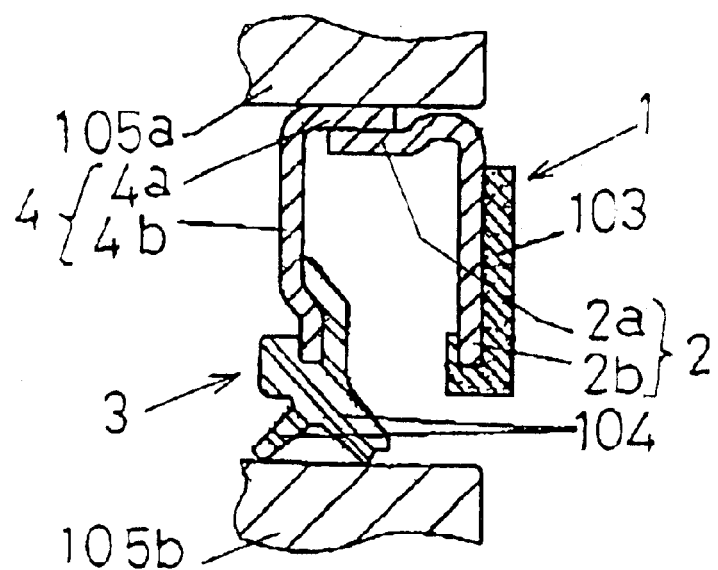
FIG. 3 represents a cross section of the encoder-equipped seal according to the third embodiment of the present invention that is mounted on the bearing unit, with some non-essential parts or elements being not shown.

Referring next to FIG. 3, the third preferred embodiment of the present invention is described below. The encoder-equipped seal according to this embodiment is shown in a cross section, although some non-essential parts or elements are not shown. This embodiment contains some parts or elements that are similar to those in the first embodiment described by referring to FIGS. 1(a) through 1(c), and those common parts or elements are given the similar reference numerals. The description of those parts or elements is therefore omitted to avoid the duplication.

In the embodiment shown in FIG. 3, the first cylindrical portion 2a of the first reinforcing ring 2 has its outer circumference engaging the inner circumference of the second cylindrical portion 4a of the second reinforcing ring 4, and the first ring element 1 and the second ring element 3 are united into one unit by fitting the one into or around the other such that the first ring element 1 is located outwardly in the axial direction of the wheel bearing unit and the second ring element 3 is located in the axial direction of the wheel bearing unit.

Otherwise, this embodiment is similar to the embodiment shown in FIG. 1(c), except that there is no such seal portion 7 formed on the side of the second flanged portion 4b on which the first ring element 1 is located. The embodiment shown in FIG. 3 can provide the similar function and effect which are provided by the first embodiment described by referring to FIGS. 1(a) through 1(c).

In the embodiment shown in FIG. 3, it should be noted that when the outer race 105a corresponds to the non-rotational element and the inner race 105b corresponds to the rotational element, although this is not shown, the encoder-equipped seal would be mounted on the bearing unit, in such a manner that the second cylindrical portion 4b of the second ring element 3 is made to engage the outer circumference of the inner race 105b and the seal lip 104 provided on the radial circumferential edge of the second flanged portion 4b of the second ring element 3 makes sliding contact with the inner circumferential surface of the outer race 105a.

(Embodiment 4)

Figure 4:
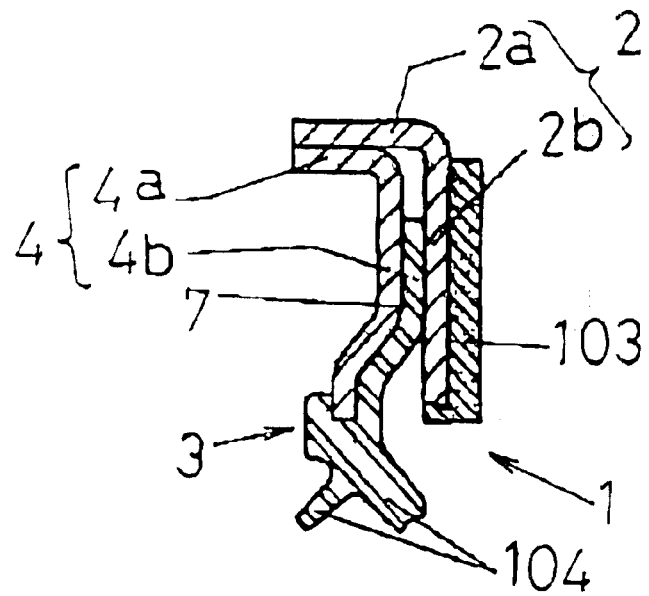
FIG. 4 represents a cross section of the encoder-equipped seal according to the fourth embodiment of the present invention, with some non-essential parts or elements being not shown.

Referring next to FIG. 4, the fourth preferred embodiment of the present invention is described below. The encoder-equipped seal according to this embodiment is shown in a cross section, although some non-essential parts or elements are not shown. This embodiment contains some parts or elements that are similar to those in the first embodiment described by referring to FIGS. 1(a) through 1(c), and those common parts or elements are given the similar reference numerals. The description of those parts or elements is therefore omitted to avoid the duplication.

This embodiment differs from the embodiment shown in FIGS. 1(a) through 1(c) in that a seal portion 7, which is formed on the side of the second flanged portion 4b of the second reinforcing ring 4 on which the first ring element 1 is located, is engaged by the side of the first ring element 1 on which the second reinforcing ring 4 is located.

More specifically, in the embodiment shown in FIG. 4, the seal portion 7 formed on the side of the second flanged portion 4b on which the first ring element 1 is located has its axial outer side that engages the axial inner side of the first flanged portion 2b.

In cases where the side of the first reinforcing ring 2 on which the second reinforcing ring 4 is located is placed with regard to the second reinforcing ring 4 such that it is located close to the second reinforcing ring 4 or engages the second reinforcing ring 4, the side of the first ring element 1 on which the second reinforcing ring 4 is located should preferably be provided to press against the seal portion 7 formed on the side of the flanged portion 4b on which the first ring element 1 is located. This would prevent any water or other foreign matter from entering the area between the first reinforcing ring 2 and second reinforcing ring 4.

For the economy of manufacturing costs, it is preferred that the seal portion 7 should be formed such that it can extend from the seal lip 104.

Otherwise, this embodiment is similar to the embodiment shown in FIGS. 1(a) through 1(c), and can provide the similar function and effect which are provided by the first embodiment described by referring to FIGS. 1(a) through 1(c).

(Embodiment 5)

Figure 5:
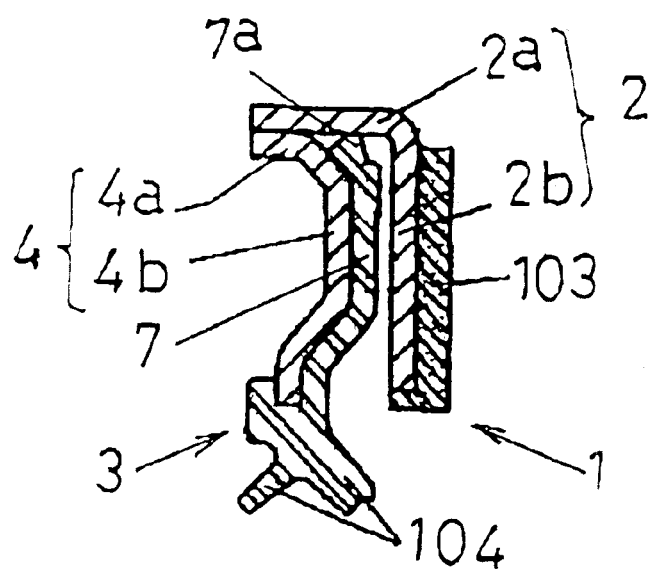
FIG. 5 represents a cross section of the encoder-equipped seal according to the fifth embodiment of the present invention, with some non-essential parts or elements being not shown.

Referring next to FIG. 5, the fifth preferred embodiment of the present invention is described below. The encoder-equipped seal according to this embodiment is shown in a cross section, although some non-essential parts or elements are not shown. This embodiment contains some parts or elements that are similar to those in the first embodiment described by referring to FIGS. 1(a) through 1(c), and those common parts or elements are given the similar reference numerals. The description of those parts or elements is therefore omitted to avoid the duplication.

This embodiment differs from the embodiment shown in FIGS. 1(a) through 1(c) in that a seal portion 7, which is formed on the side of the second flanged portion 4b of the second reinforcing ring 4 on which the first ring element 1 is located, is engaged by the side of the first ring element 1 on which the second reinforcing ring 4 is located.

More specifically, in the embodiment shown in FIG. 5, the seal portion 7 formed on the side of the second flanged portion 4b on which the first ring element 1 is located has its axial outer end 7a that engages the inner circumferential surface of the first cylindrical portion 2a of the first ring element 1.

The encoder-equipped seal according to the embodiment shown FIG. 5 can provide the functional effects that are equivalent to those provided by the embodiments shown in FIGS. 1(a) through 1(c) and FIG. 4.

In the embodiment described by referring to FIG. 4, the seal portion 7 is provided for extending in the plane and engaging the side of the first flanged portion 2b on which the second reinforcing ring 4 is located, whereas it may be seen from the embodiment shown in FIG. 5 that the seal portion 7 is provided so that it can engage the inner circumferential surface of the first cylindrical portion 2a, or may be provided so that it can have a plurality of projections, although this is not shown. The shape of the seal portion 7 can be determined, depending upon the particular performance requirements.

(Embodiment 6)

Figure 6:
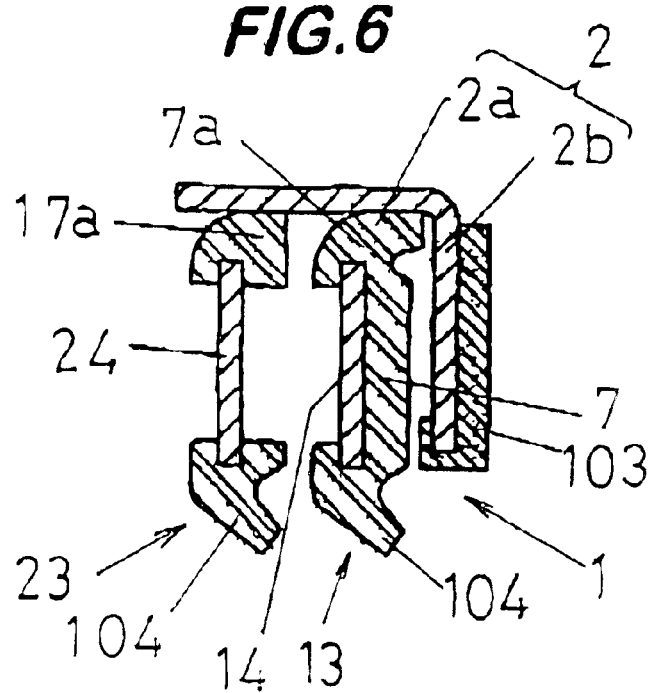
FIG. 6 represents a cross section of the encoder-equipped seal according to the sixth embodiment of the present invention, with some non-essential parts or elements being not shown.

Referring next to FIG. 6, the sixth preferred embodiment of the present invention is described below. The encoder-equipped seal according to this embodiment is shown in a cross section, although some non-essential parts or elements are not shown. This embodiment contains some parts or elements that are similar to those in the first embodiment described by referring to FIGS. 1(a) through 1(c), and those common parts or elements are given the similar reference numerals. The description of those parts or elements is therefore omitted to avoid the duplication.

The encoder-equipped seal according to the embodiment shown in FIG. 6 includes a first ring element 1 and a plurality of second ring element, such as ring elements 13, 23, wherein the second ring elements 13, 23 are fitted inside the first ring element 1, with the second ring elements 13, 23 being located axially inside the wheel bearing unit.

The second ring element 13 includes a second reinforcing ring 14 having a second flanged portion extending radially, and a seal lip 104 disposed on the radial inner circumferential edge of the second flanged portion of the second reinforcing ring 14. The seal lip 104 is formed so that it extends up to the side of the second flanged portion on which the first ring element 1 is located, and includes a seal portion 7 formed on the side of the second flanged portion on which the first ring element 1 is located. When the first ring element 1 and second ring element 13 are united into one unit, with the second ring element 13 being located axially inside the wheel bearing unit, the seal lip 104 is made to engage the outer circumference of the inner race 105b of the wheel bearing unit, and a seal portion 7a formed on the radial outer side of the seal portion 7 is made to engage the inner circumference of the first cylindrical portion 2a.

The second ring element 23, which is disposed axially inside the first ring element 13, includes a second reinforcing ring 24 having a second flanged portion extending radially, a seal lip 104, and a seal portion 17a, wherein the seal lip 104 and seal portion 17a are provided on the radial inner and outer circumferential edges of the second flanged portion, respectively.

When the first ring element 1 and second ring elements 13, 23 are united into one unit, with the second ring element 23 being located axially inside the second ring element 13, the seal lip 104 is made to engage the outer circumference of the inner race 105b of the wheel bearing unit, and a seal portion 17a is made to engage the inner circumference of the first cylindrical portion 2a.

The required sealing capability can be achieved by providing a plurality of such second ring elements 13, 23, which has the simple construction as shown and described.

In accordance with the embodiment shown in FIG. 6, the second ring elements 13, 23 can be manufactured at less cost because of their simple construction, and the encoder-equipped seal of the present invention can be obtained at less cost accordingly.

As the embodiment shown in FIG. 6 allows for the use of the second ring elements 13, 23 having the simple construction, the useful encoder-equipped seal that can be used for a wide range of applications can be obtained at less cost.

(Embodiment 7)

Figure 7:
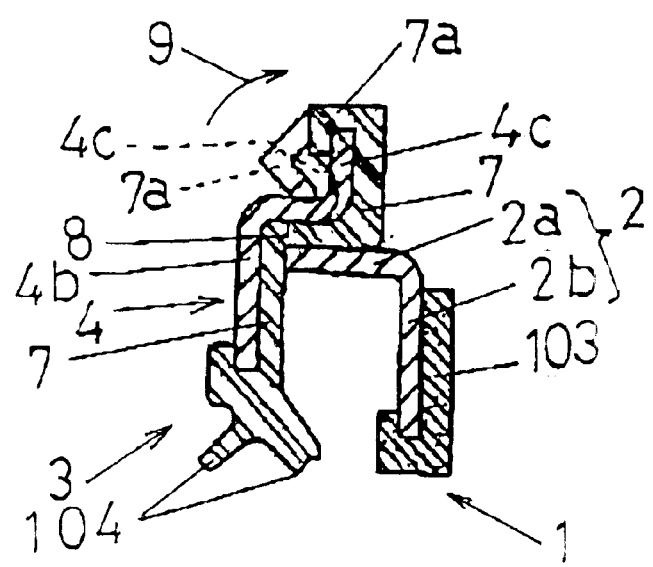
FIG. 7 represents a cross section of the encoder-equipped seal according to the seventh embodiment of the present invention, with some non-essential parts or elements being not shown.
Figure 8:
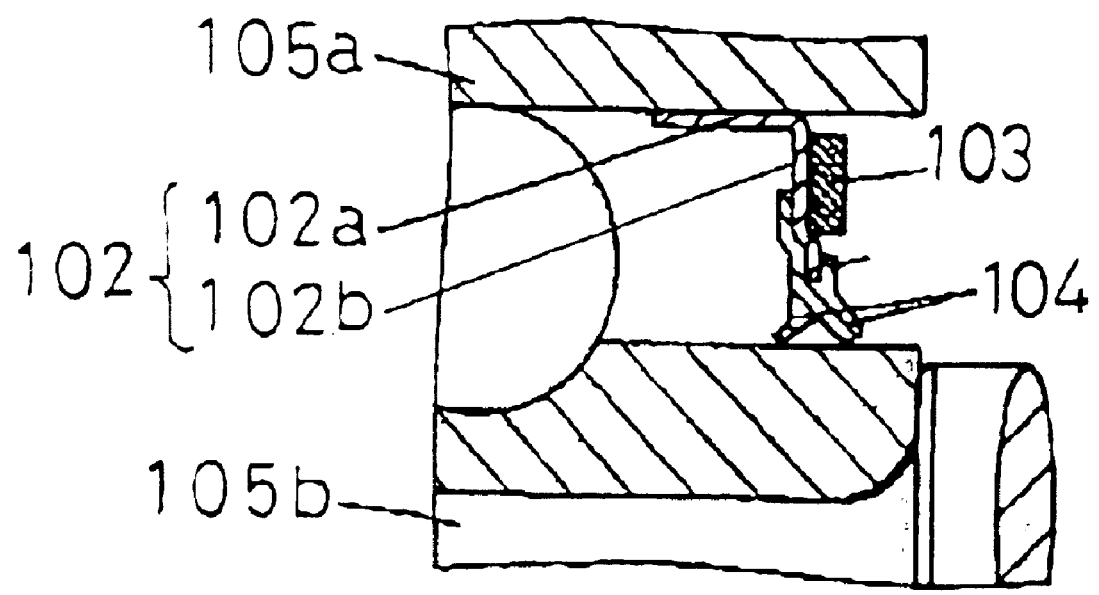
FIG. 8 represents a cross section of the encoder-equipped seal according to the prior art that is mounted on the bearing unit, with some non-essential parts or elements being not shown.

Referring next to FIG. 7, the seventh preferred embodiment of the present invention is described below. The encoder-equipped seal according to this embodiment is shown in a cross section, although some non-essential parts or elements are not shown. This embodiment contains some parts or elements that are similar to those in the first embodiment described by referring to FIGS. 1(a) through 1(c), and those common parts or elements are given the similar reference numerals. The description of those parts or elements is therefore omitted to avoid the duplication.

In the encoder-equipped seal that will be described below according to the embodiment shown in FIG. 7, the second flanged portion 4b of the second reinforcing ring 4 includes a portion for engaging the first reinforcing ring 2, wherein the first ring element 1 and the second ring element 3 are united into one unit by allowing that portion to engage the first reinforcing ring 2.

More specifically, in the embodiment shown in FIG. 7, the second flanged portion 4b of the second reinforcing ring 4 includes a stepped portion 8 formed on its middle way, the stepped portion 8 being bent toward the first ring element 1. This stepped portion 8 corresponds to the portion for engaging the first reinforcing ring 2. The first ring element 1 and the second ring element 3 are united into one unit by allowing the stepped portion 8 to engage the first cylindrical portion 2a of the first ring element 1.

In forming the stepped portion 8 on the middle way of the second flanged portion 4b of the second reinforcing ring 4 such that the stepped portion 8 can be bent toward the first ring element 1, the outer circumferential edge 4c of the second flanged portion 4b can be formed as shown in broken lines in FIG. 7, and the first ring element 1 and second ring element 3 are united firmly and securely into one unit by allowing the stepped portion 8 to engage the first cylindrical portion 2a and by enlarging the outer circumferential edge 4c by pushing it up in the direction as indicated by arrow 9.

In the embodiment shown in FIG. 7, the second flanged portion 4b of the second reinforcing ring 4 has a seal portion 7 on the side thereof on which the first ring element 1 is located, and the side of the first ring element 1 on which the second reinforcing ring 4 is located engages the seal portion 7. It should be noted, however, that as a variation of this embodiment, a seal lip 104 is provided on the inner circumferential edge of the second flanged portion 4b, with a seal portion 7a being provided on the outer circumferential edge.

Although the present invention has been described with reference to several particular preferred embodiments thereof, it should be understood that the present invention is not limited to those embodiments, and various changes or modifications may be made to the embodiments without departing from the spirit and scope of the invention as defined in the appended claims.

What is claimed is:

1. An encoder-equipped seal including an elastic element and a reinforcing ring for mounting on a wheel bearing unit on an automotive vehicle or sealing the bearing unit and for detecting a number of revolutions of the wheel, further including a first ring element and a second ring element, wherein the first ring element includes a first reinforcing ring having a first cylindrical portion extending in an axial direction of the wheel bearing unit and a first flanged portion extending from the first cylindrical portion in a radial direction, and a magnetic ring attached to the first flanged portion of the first reinforcing ring;

the second ring element includes a second reinforcing ring having a second flanged portion extending in the radial direction, and a seal lip arranged radially on a circumferential edge of the second flanged portion of the second reinforcing ring; and the first ring element and the second ring element are united into one unit by allowing one to engage the other, in such a manner that the first ring element is located outwardly in the axial direction of the wheel bearing unit and the second ring element is located inwardly in the axial direction of the wheel bearing unit.

2. The encoder-equipped seal as defined in claim 1, wherein the second ring element, which is combined with the first ring element such that the second ring element is located inwardly in the axial direction of the wheel bearing unit, includes a plurality of second ring elements disposed in the axial direction of the wheel bearing unit.

3. The encoder-equipped seal as defined in claim 1, wherein the second reinforcing ring further includes a second cylindrical portion extending from the second flanged portion in the axial direction of the wheel bearing unit, and wherein the first ring element and the second ring element are united into one unit by allowing the second cylindrical portion of the second reinforcing ring to engage the first cylindrical portion of the first reinforcing ring.

4. The encoder-equipped seal as defined in claim 1, wherein the second flanged portion of the second reinforcing ring further includes a portion for engaging the first reinforcing ring, and wherein the first ring element and the second ring element are united into one unit by allowing this portion to engage the first reinforcing ring.

5. The encoder-equipped seal as defined in claim 1, wherein the second flanged portion of the second reinforcing ring further includes a seal portion provided on the side of the second flanged portion on which the first ring element is located, and the seal portion on the second flanged portion is engaged by the side of the first ring element on which the second reinforcing ring is located.

* * * * *